United States Patent [19]

McMahon

[11] Patent Number: 5,167,163
[45] Date of Patent: Dec. 1, 1992

[54] ENERGY TRANSFER DEVICE

[76] Inventor: John C. McMahon, Box 13776, Kansas City, Mo. 64199

[21] Appl. No.: 711,118

[22] Filed: Jun. 4, 1991

Related U.S. Application Data

[63] Continuation of Ser. No. 635,415, Jan. 3, 1991, abandoned, which is a continuation of Ser. No. 565,883, Aug. 9, 1990, abandoned, which is a continuation of Ser. No. 478,011, Feb. 7, 1990, abandoned, which is a continuation of Ser. No. 363,345, Jun. 6, 1989, abandoned, which is a continuation of Ser. No. 296,922, Jan. 11, 1989, abandoned, which is a continuation of Ser. No. 188,123, Apr. 25, 1988, abandoned, which is a continuation of Ser. No. 926,869, Nov. 3, 1986, abandoned, which is a continuation of Ser. No. 860,708, May 5, 1986, abandoned, which is a continuation of Ser. No. 674,470, Nov. 21, 1984, abandoned, which is a continuation of Ser. No. 428,305, Sep. 29, 1982, abandoned.

[51] Int. Cl.$^5$ .............................................. F16H 27/04
[52] U.S. Cl. ........................................... 74/84 S; 74/61
[58] Field of Search ................... 74/84 S, 84 R, 61; 180/7.1

[56] References Cited

U.S. PATENT DOCUMENTS

| | | | |
|---|---|---|---|
| 1,953,964 | 4/1934 | Laskowitz | 74/14 |
| 2,227,867 | 1/1941 | Steinhouse | 74/61 |
| 2,972,895 | 2/1961 | Wilson | 74/61 |
| 3,268,749 | 8/1966 | Matsuo | 310/81 |
| 3,398,798 | 8/1968 | Shelton | 74/61 X |
| 3,433,311 | 3/1969 | Lebelle | 74/61 X |
| 3,564,932 | 2/1971 | Lebelle | 74/61 |
| 3,810,394 | 5/1974 | Novak | 74/87 |
| 3,968,700 | 7/1976 | Cuff | 74/84 S |
| 3,998,107 | 12/1976 | Cuff | 74/84 S |
| 4,095,460 | 6/1978 | Cuff | 74/84 S |
| 4,186,613 | 2/1980 | Carlson, Jr. | 74/52 |
| 4,238,968 | 12/1980 | Cook | 74/84 R |
| 4,242,918 | 1/1981 | Srogi | 74/84 S |

FOREIGN PATENT DOCUMENTS 486212 6/1938 United Kingdom ............ 74/61

Primary Examiner—Rodney H. Bonck

[57] ABSTRACT

An apparatus for converting rotational movement into linear movement in vehicles comprises a flywheel rotated about a center by a rotary motion producing motor. The flywheel has rotatably mounted thereon a plurality of weighted members which rotate about an axis associated therewith with each axis being spaced from the flywheel center. Each of the weighted members has a center of gravity which is spaced from the rotational axis associated therewith. Rotation of the weighted members is synchronized with rotation of the flywheel such that when the weighted member is on one side a non-rotating coordinate system, the distance between the center of gravity associated with the respective weighted member is further spaced from the flywheel center then when the weighted member is on an opposite side of the coordinate system such that an overall center of gravity of the rotating apparatus is always positioned on one side of the coordinate system. Preferably the apparatus is utilized with a mirror image thereof such that a flywheel associated with the mirror image is in the same plane as the flywheel of the apparatus but rotates opposite with respect thereto such that angular momentum of the apparatus generally cancels the angular momentum of the mirror image apparatus and only a linear thrust results. The apparatus may be utilized in coordination with additional similar apparatuses positioned perpendicular to the original apparatus and including flywheels having selective rotational speeds.

11 Claims, 3 Drawing Sheets

ENERGY TRANSFER DEVICE

CROSS-REFERENCE TO RELATED APPLICATIONS

The present application is a continuation of application Ser. No. 07/635,415, filed Jan. 3, 1991, now abandoned; which is a continuation of application Ser. No. 07/565,883 filed Aug. 9, 1990, now abandoned; which is a continuation of application Ser. No. 07/478,011, filed Feb. 7, 1990, now abandoned; which is a continuation of application Ser. No. 07/363,345, filed Jun. 6, 1989, now abandoned; which is a continuation of application Ser. No. 07/296,922, filed Jan. 11, 1989, now abandoned; which is a continuation of application Ser. No. 07/188,123, filed Apr. 25, 1988, now abandoned; which is a continuation of application Ser. No. 06/926,869, filed Nob. 3, 1986, now abandoned; which is a continuation of application Ser. No. 08/860,708, filed May 5, 1986, now abandoned; which is a continuation of application Ser. No. 07/674,470, filed Nov. 21, 1984, now abandoned; which is a continuation of application Ser. No. 06/428,305, filed Sept. 29, 1982, now abandoned.

BACKGROUND OF THE INVENTION

The present invention relates to converting rotational movement or momentum into linear movement or thrust and in particular relates to a device which rotates while maintaining a center of gravity of the device on one side thereof relative to a stationary coordinate system.

Historically, various devices have been developed to translate rotational movement into a linear movement. Such devices frequently utilize rotation of a structure about an axis such that the structure has an eccentric rotating mass. That is, such structures utilize the effect produced by increasing the lever arm associated with a center of gravity on one side of a center of rotation while minimizing the effect of the mass rotating against a lever arm on the opposite side of the structure. This concept is frequently demonstrated by a washing machine which has been loaded unevenly and then "walks across the floor." Such walking results because the floor upon which the washing machine sets is slanted so that when the eccentric is rotating so as to have a directional vector downhill, the washing machine moves but when the eccentric has the directional vector uphill the gradient of the floor acts to counteract movement such that the washing machine only appears to move in one direction. Unfortunately such a concept is not very controllable and is unpractical for use in actual vehicles.

Certain other devices have attempted to improve upon the washing machine walking concept by attempting to modify the eccentricity of the position of the center of gravity of the structure relative to the center of rotation of the structure as same rotates. For example, one type of device for which there were numerous embodiments developed comprised a ring defining an interior race about which race a follower device rotates. The race follower device rotates about an axis which is positioned off center relative to the race itself. Therefore, the race follower has a lever arm which is different on the opposite side of the axis thereof; however, because the race engages the race follower device, the race reacts to the forces exerted thereon by the race follower device with an equal but opposite force which has the effect of making it very difficult to produce a single thrust vector from the overall structure.

Other devices have been developed for producing a rotating eccentric which have utilized arms rotating in various directions or the like to transfer a mass therebetween and thus attempt to maintain a center of gravity on one side of a structure. In general, the rotating transfer devices have been rather complex in design and not well suited to high rotational velocities or application in relatively heavy vehicles. In addition, when rotational movement or rotational momentum actually is translated into linear movement or linear thrust by transfer of energy from an angular vector to a linear vector, it is common in the prior art devices for a rotational vector to remain. While the concept of developing a device for translating some rotational movement into linear movement is interesting to contemplate, for practical use it is necessary to be able to control the thrust and it is is desirable to eliminate rotational movement or vectors in order to thus produce only linear movement. Many of the prior art devices of the type described do translate angular movement to linear movement but fail to provide for elimination of all of the angular movement.

It is desired to have a device which will translate energy in the form of rotational movement produced by a rotational motor device, such as an electrical motor, in a vehicle into a linear thrust for that vehicle, while at the same time eliminating rotational thrust associated with the motor. It is also desirable to have an apparatus which can be motivated to move along more than one linear path. For example, if the vehicle is to move in a two-dimensional manner, it is desirable to be able to produce selectively variable linear thrusts along axes which are perpendicular to each other so that the net effect of the thrusts will be to motivate the vehicle anywhere in a two-dimensional plane through operation of the apparatus in either forward or reverse modes. Three-dimensional motivational vehicles may also be provided by having an apparatus which motivates the vehicle along three perpendicular axes and are particularly suited for movement in water and in outer space. Elimination of net rotational vectors in a space vehicle is especially important, since having net rotational vectors will spin the vehicle and make same unsuitable for use. Finally, for use in any vehicle, the structure which translates the angular momentum into linear thrust must be of such a nature as to withstand relatively high velocities. There is a trade-off between the diameter of the apparatus and the velocity. The smaller the diameter, the faster it must spin to create the same thrust. Since vehicles typically have a limited amount of space and yet may be fairly heavy, a relatively high rotational velocity may be required at times.

OBJECTS OF THE INVENTION

Therefore the objects of the present invention are: to provide an apparatus for translating angular momentum from a rotary motion device into linear thrust directed against a vehicle in a particular path so as to motivate the vehicle along the path; to produce such an apparatus which is relatively simple in design; to produce such an apparatus which is functional under relatively high angular velocities; to produce such an apparatus which does not require transfer of mass between various rotating structures; to provide such an apparatus which eliminates or effectively cancels substantially all net angular momentum developed thereby so as to produce only a resulting linear thrust; to produce such an apparatus wherein a structure is rotated about a center while maintaining a center of gravity of such structure on one side of the apparatus relative to a fixed coordinate system; to provide such an apparatus which is suited for producing linear movement in two-dimensions or three-dimensions; and to provide such an apparatus which is relatively simple to build, inexpensive to manufacture, and particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

An apparatus is provided for converting rotary motion into a linear motion or conversion of an angular momentum produced by a rotary motor into a linear thrust to be used in propelling a vehicle. The apparatus comprises a flywheel structure rotatably mounted upon a frame so as to be rotatable about a center thereof. As used herein, the terms flywheel or flywheel structure are meant to refer to a device having form and mass which is generally rigid in construction but which is not necessarily uniform throughout. Preferably the flywheel structure rotates in a planar fashion and has an X axis and a Y axis associated with the plane about which axes the flywheel structure is generally symmetrical at any given instant.

A rotary motor means, such as an electric motor, is connected by suitable gears and drive belts to the flywheel structure so as to motivate the flywheel structure to rotate in proportional relation therewith. Preferably a plane associated with the rotation of the motor means is perpendicular to the plane associated with the rotation of the flywheel structure.

The flywheel structure has rotatably mounted thereupon at least one weighted member. The weighted member is rotatable about an axis of rotation associated therewith. The axis of rotation of the weighted member is spaced from the center of the flywheel structure and is also spaced from a center of gravity of the weighted member.

The weighted member is driven through suitable gears, drive belts or the like by suitable rotary motor means to rotate about the axis of rotation associated therewith. Preferably, the motor means driving the rotation of the flywheel and the rotation of the weighted member are either the same device or closely coordinated. Also the weighted member is rotated in synchronization with the flywheel such that the combined effect of rotating the weighted member and the flywheel structure will result in the center of gravity of the combination of the weighted member and the flywheel structure being positioned on one side of the flywheel structure relative to a fixed or non-rotating coordinate system, so as to have the effect of maintaining an eccentric weight distribution on such a side of the flywheel structure spaced from the center thereof while the flywheel structure is rotating. This in turn produces a rotational momentum about the flywheel structure center and a linear thrust which is generally normal to a radius drawn to the overall net resulting lever arm of the center of gravity of the combined structure and member over a period of at least one complete rotation. (It is noted that the position and length of the lever arm of the center of gravity of the combined flywheel structure and weighted member varies over time and that the net resulting position thereof is the effective position after integration through an entire 360 degree rotation of the flywheel structure which is left after all oppositely directed forces have been negated. As used herein, the lever arm is the distance from the center of the rotating structure to the center of gravity.

The net resulting center of gravity has a directional vector associated therewith which will be in the direction of the net linear thrust produced by the apparatus.

Preferably the flywheel structure is circular and divided into generally equal sectors having centered within each sector a weighted member as described above. The weighted members are all essentially identical and are positioned such that the center of gravity of each is positioned furthest from the flywheel structure center when such center of gravity is aligned with the X axis on one side of the Y axis and closest to the flywheel structure center when the center of gravity thereof is aligned with the X axis on the opposite side of the Y axis. Also preferably, each weighted member makes less than a 360 degree rotation relative to the coordinate system defined by the X axis and the Y axis during translation from alignment from the X axis on one side of the Y axis to the X axis on the opposite side of the Y axis.

Also preferably the apparatus is utilized in conjunction with a mirror image apparatus which is essentially identical to the apparatus described except that it is a mirror image thereof and in that flywheel structure associated with the mirror image apparatus rotates in the opposite direction as compared to the flywheel structure associated with the apparatus but generally in the same plane thereas. The motor means may be a single electric motor utilized to motivate rotation of both flywheel structures and each of the weighted members associated therewith in the combination of the apparatus and mirror image apparatus or alternatively separate synchronized motors may be utilized for the apparatus and alternative apparatus when it is desired to cancel the rotational effect due to the motor means acting upon an associated support structure. In particular a pair of motor means may be mounted so as to have their rotational axes align parallel to one another except that both rotate in opposite directions.

It is also possible to provide for linear thrust in two- or three-dimensional directions. This is accomplished by placement of a first apparatus having a flywheel rotating in one plane so as to be perpendicular to a plane of rotation of a flywheel associated with a second apparatus. In this manner a linear thrust can be provided in two perpendicular directions. In addition, movement may be provided between the two perpendicular directions by rotating the first flywheel faster or slower relative to the second flywheel as needed to modify direction.

Three-dimensional movement is provided by simply providing a third apparatus having a flywheel which rotates in a plane which is perpendicular to both the planes associated with the flywheel of the first apparatus and the flywheel of the second apparatus. The vehicle may be operated in a reverse mode by either reversing the direction of rotation associated with the apparatus or by providing another apparatus which may be selectively rotated in a reverse direction such that when reverse or stopping is desired the first or forward apparatus is stopped and the reverse apparatus is activated so as to provide a reverse thrust. Full three-dimensional movement of a vehicle can thereby be provided by the apparatus described herein.

The drawings constitute a part of this specification and include exemplary embodiments of the present invention and illustrate various objects and features thereof.

DETAILED DESCRIPTION OF THE PRESENT EMBODIMENT

Figure 1:
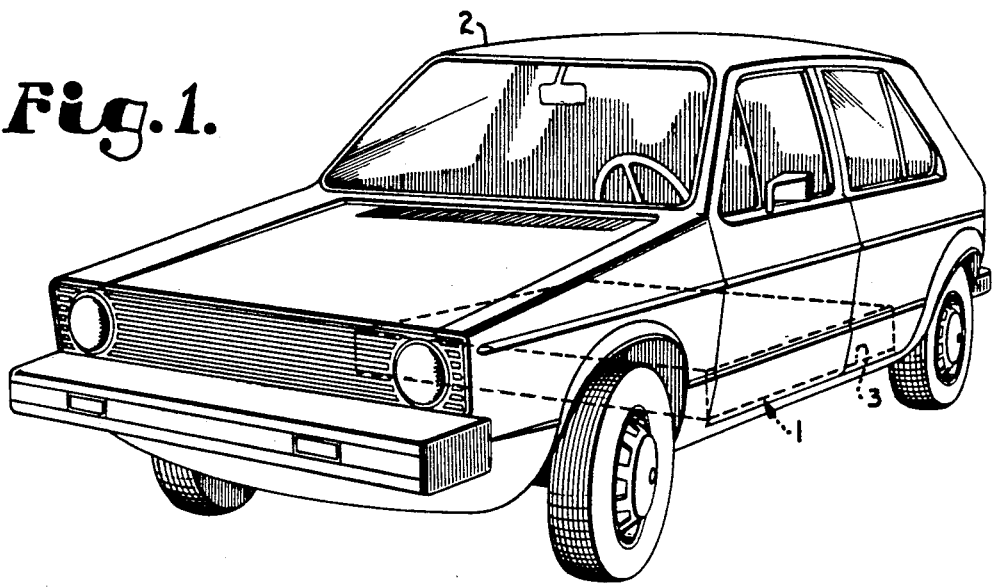
FIG. 1 is a perspective view of a vehicle having therein a linear thrust mechanism according to the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 in FIGS. 1 through 5 generally represents a device for translating rotational movement to linear movement according to the present invention. The device 1 is shown positioned within a vehicle 2 and is encased in a support structure 3, shown only in FIG. 1. Although the apparatus 1 is shown in an automobile-type vehicle 2, it is foreseen the same could be utilized in numerous different types of land vehicles and water surface vehicles, and may be utilized also in vehicles moving in three-dimensional directions such as submarines or space vehicles.

The device 1, as shown in FIGS. 1 through 5 includes a first apparatus 10 and a second or mirror image apparatus 11 both being rotatably driven by an electric motor apparatus 12. Preferably, the apparatus 10, the mirror image apparatus 11, the motor 12 and associated connecting hardware are freestanding except for a pedestal 15 positioned generally vertically beneath the motor 12 and connecting each of the previously named elements to the support structure 3 without engagement of any of the other elements with the support structure 3 at other locations. The pedestal 15 has extending upwardly therefrom a frame member 18 which diverges into frame arm members 19 and 20. The frame arm members 19 and 20 extend generally parallel to a plane associated with rotation of the motor 12, that is such plane passes normal through the axis of rotation of a drive shaft 22 associated with the motor 12.

Figure 3:
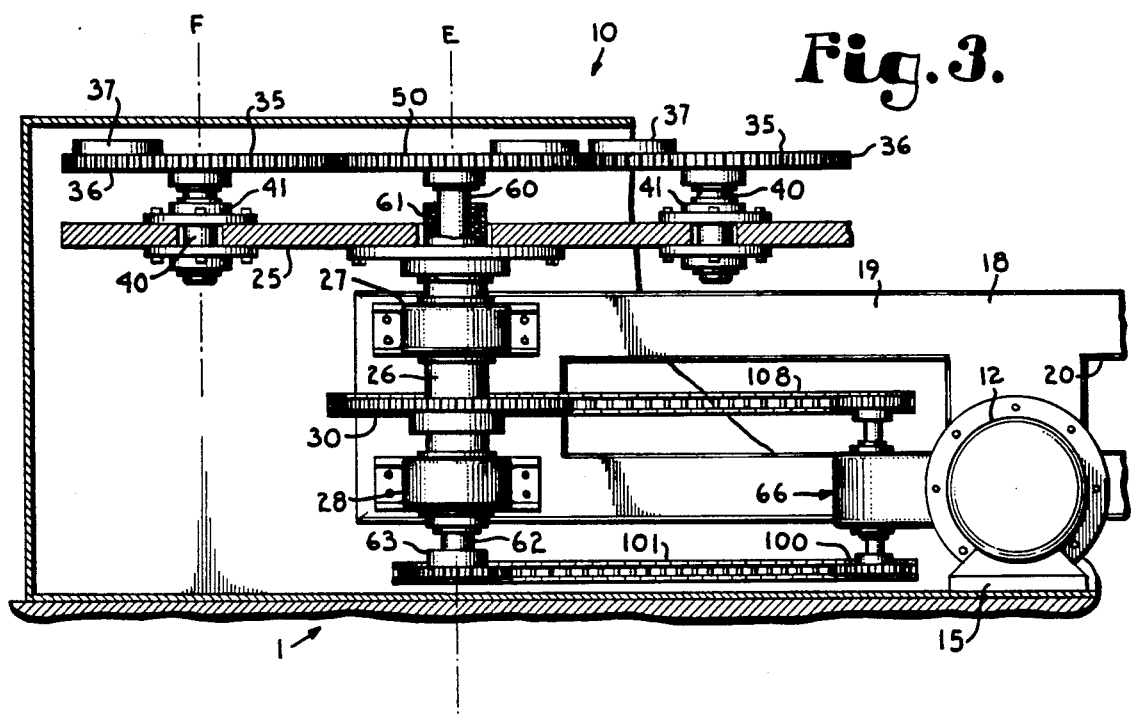
FIG. 3 is an enlarged and partial side elevational view of the linear thrust mechanism showing a flywheel, a flywheel support structure, weighted members, and a drive motor associated therewith with portions broken away to show detail thereof.

The apparatus 10 generally comprises a circular and symmetrical disc or flywheel 25 mounted upon and concentrically rotating with a drive shaft 26, FIG. 3. The drive shaft 26 is vertically aligned in the present embodiment and positioned to freely rotate within suitable pillow blocks 27 and 28. The shaft is is rotatably driven by drive gear 30 secured to the shaft 26 by suitable connection means such as bolts or the like. The illustrated flywheel 25 rotates within a plane which is perpendicular to the plane associated with rotation of the motor 12. The flywheel 25 has an axis of rotation represented by the letter E which axially passes through the shaft 26 and which defines a center of rotation for the flywheel 25 at the location where it passes through the flywheel 25.

Figure 5:
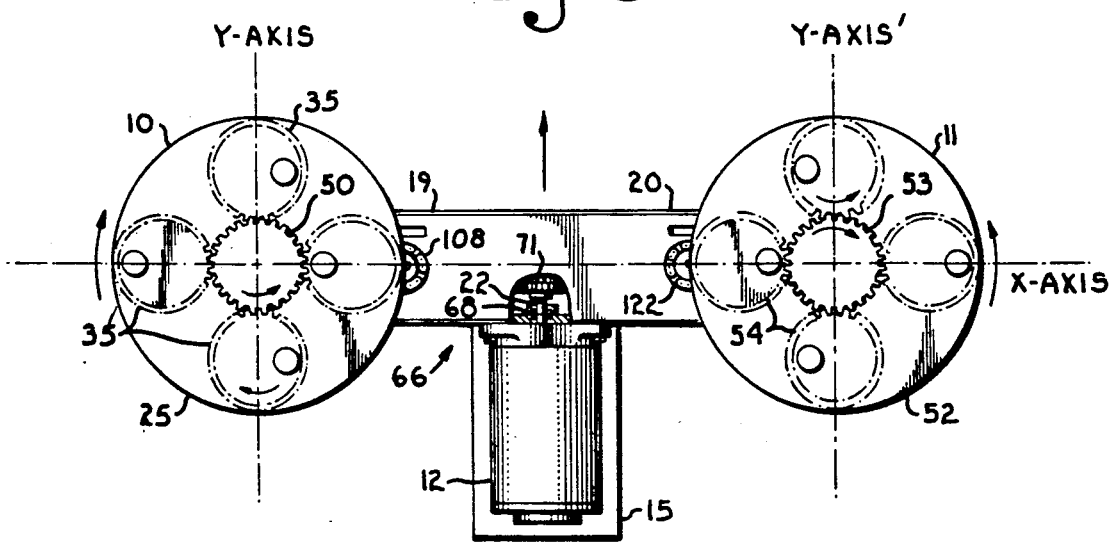
FIG. 5 is an enlarged partial top plan view of the linear thrust mechanism.

Rotatably mounted upon the flywheel 25 are a plurality of weighted members 35. Each of the weighted members 35 includes a circular gear 36 and a weighted mass 37 secured to each gear 36. Each gear 36 is secured to the flywheel 25 by as shaft 40 mounted in a bearing device 41 such that the shaft 40 remains perpendicular to the flywheel 25 but is freely rotatably relative to the flywheel 25. Each gear 36 is mounted normal to an associated shaft 40 such that the gears 36 have a plane of rotation which is generally parallel to the plane of rotation associated with the flywheel 25. The plane of rotation of the flywheel has associated therewith a pair of axes which are perpendicular to one another and, as are shown in FIG. 5, include an X axis and a Y axis. Each gear 36 and shaft 40 have associated therewith an axis of rotation generally designated by the axis F, as shown in FIG. 3, which axis F passes coaxially through an associated shaft 40.

Figure 2:
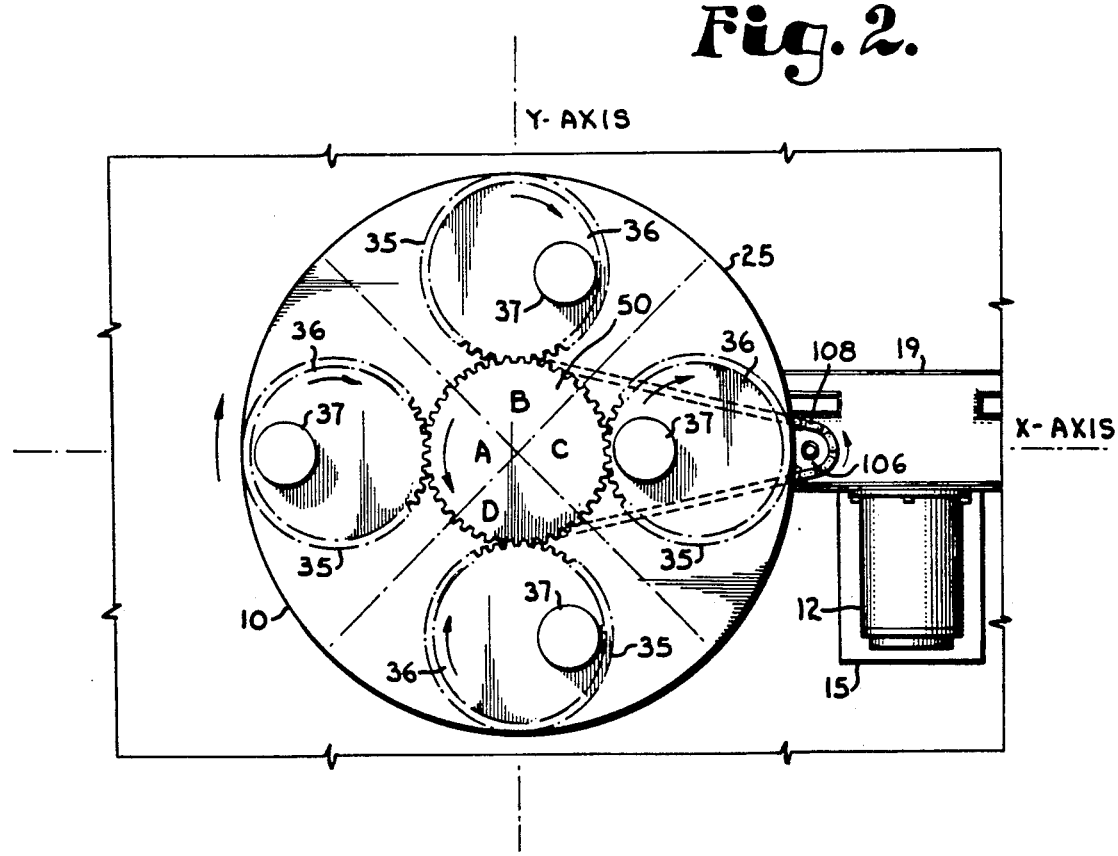
FIG. 2 is an enlarged partial top plan view of the linear

As seen in FIG. 2, the flywheel 25 can be seen as being divided into four equal sectors for illustrative purposes labeled A, B, C and D having an arc of 90 degrees each. Each sector A, B, C and D has positioned in a circumferential middle thereof but spaced equally from the axis E one of said gears 36. The gears 36 function as planetary gears which are driven by a central drive gear 50. The axis of rotation F of each of the planetary gears 36 is approximately equally spaced from the axis of rotation E of the flywheel 25 and are each equally spaced from the axis of rotation F associated with the gear 36 located in sectors adjacent to the sector within which each gear 36 is located. As seen in FIGS. 2 and 5 the flywheel 25 rotates clockwise as do each of the gears 36. The drive gear 50 rotates counterclockwise. The weighted masses 37 are positioned on respective gears 36, as best seen in FIGS. 2 and 5, such that when one of the masses 37 is centrally located over the X axis, the center of gravity of the combination of an associated gear 36 and mass 37 is also centered over the X axis and positioned as far from the axis of rotation E (see FIG. 3) of the flywheel 25 as possible when positioned to the left of the Y-axis. Also, as seen in FIG. 2, when one of the weighted masses 37 is positioned on an associated gear 36 such that the center of gravity of the weighted mass 37 aligns with the X axis on an opposite side of the Y axis, as seen on the right side of FIG. 2, the respective weighted mass 37 will be as close as possible to the axis E of rotation of the flywheel 25.

The mirror image apparatus 11 is essentially the same as the apparatus 10 except it is mirror image thereof, see FIG. 5. The mirror image apparatus 11 has a flywheel 52 associated therewith which rotates in the same plane as the flywheel 25 except in the opposite direction, that is counterclockwise. In construction, size, shape and weight the mirror image apparatus 11 is essentially identical to the apparatus 10 except for being a mirror image thereof. An illustrated drive gear 53 is approximately the same diameter as and mates with periphery about each of four associated gears 54 of about the same size and shape as the gears 36.

The diameter of the gears 36 and 54 of the illustrated embodiment also have a diameter which is approximately the same length as the distance separating the gear axis F and the flywheel axis E. The drive gear 50 is mounted upon a shaft 60 which is coaxial with the flywheel drive shaft 26. The shaft 60 is generally perpendicular to the drive gear 50 and is journaled within the shaft 26 on bearings 61 so as to rotate independent of the shaft 26. The drive shaft 60 extends beyond the shaft 26 opposite the drive gear 50 so as to have a free end 62 upon which a drive sprocket gear 63 is secured for rotation with the shaft 60. The spocket gear 63 rotates coaxially with the shaft 60.

Figure 4:
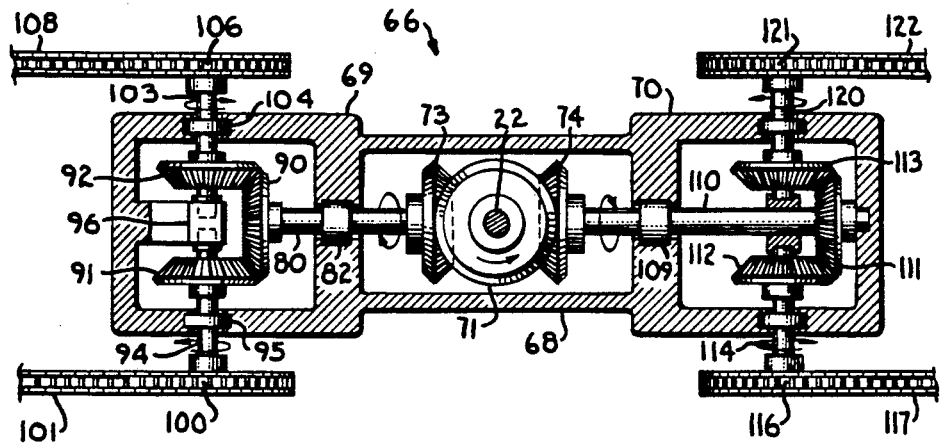
FIG. 4 is an enlarged and partial side view of the mechanism detailing linkage associated with the motor having portions of linkage and support members broken away to show detail thereof.

The drive motor 12 cooperates with the apparatus 10 and the mirror image apparatus 11 through a connecting drive train 66. The drive train 66 includes three interconnected gear housings, 68, 69 and 70, as best seen in FIG. 4. The gear housing 68 receives the shaft 22 from the motor 12 through a side thereof so as to rotate within a suitable bearing. Attached to the end of the shaft 22 is a beveled gear 71 having a 45-degree bevel. Engaging the beveled gear 71 on opposite sides thereof are beveled gears 73 and 74 which mate or mesh with the gear 71 and are rotated in opposite directions thereby. The gear 73 is attached to a shaft 80 which is mounted in a side wall of the gear box 68 so as to rotate in a bearing 82. The shaft 80 extends into the gear box 69 and has another beveled gear 90 attached to an end thereof opposite gear 73 so as to rotate therewith. The beveled gear 90 has sides beveled at 45 degrees. A pair of beveled gears 91 and 92 mate with the beveled gear 90 on opposite sides thereof so as to be rotated in opposite directions. The gear 91 is attached to a shaft 94 which extends through a bearing 95 in the gear box 69 so as to be supported thereby and is further supported by a slip joint 96 positioned in the center of the gear box 69 to provide stability thereto. The shaft 94 has a sprocket gear 100 coaxially attached thereto on an end outside of the gear 91 so as to rotate concentrically therewith and exterior of the box 69. The sprocket gear 100 is connected to sprocket gear 63 on the drive shaft 26 of the drive gear 50 by a drive chain 101. Likewise the gear 92 is connected through a shaft 103 which is supported by a bearing 104 in the side of the gear box 69 and the slip joint 96. The shaft 103 is coaxially attached to a sprocket drive gear 106 which is connected to the drive gear 30 by a link drive belt 108. The drive gear 30 of the present embodiment is twice the diameter of the sprocket gear 106, whereas the sprocket gear 63 is approximately the same diameter as the sprocket gear 100. In this manner the sprocket gear 30 rotates at one-half the angular velocity at the periphery in a reversed direction as compared to the sprocket gear 63 such that the drive gear 50 rotates at approximately twice the speed in reversed direction to the flywheel 25.

The side of the gear train 66 associated with the mirror image apparatus 11 is essentially also the mirror image of the portion of the gear train associated with the apparatus 10 described above except as noted. In particular the gear 74 rotates a shaft 110 which passes through the gear bpx 68 on bearing 109 into the gear box 70 and therein rotates a beveled gear 111 which in turn rotates a pair of beveled gears 112 and 113 positioned on opposite sides of the beveled gears 111 so as to be rotated in opposite directions. The gear 111 is not a true mirror image of the gear 90 but is positioned to rotate gears 112 and 113 in the opposite direction as the gears 91 and 92 respectively. The beveled gear 112 has a shaft 114 attached thereto which extends through the gear box 70 and is attached to a sprocket gear 116 so as to rotate coaxially therewith and drive a chain drive belt 117. Likewise bevel gear 113 is attached to a shaft 120 which extends through the gear housing 70 and is attached to a sprocket gear 121 to rotate coaxially therewith and drive a chain belt 122. Belts 117 and 122 drive suitable connecting gears or sprockets on mirror image apparatus 11 to effectively rotate drive gear 53 and flywheel 52 respectively. In this manner the chain belts 122 and 117 rotate in opposite directions and the chain belts 108 and 122 rotate in opposite directions, also the belts 101 and 117 rotate in opposite directions such that the flywheels 25 and 50 of apparatus 10 and 11 respectively rotate in opposite directions and the weighted members on each of the apparatus 10 and 11 rotate in the same direction as the flywheels associated therewith.

Figure 6:
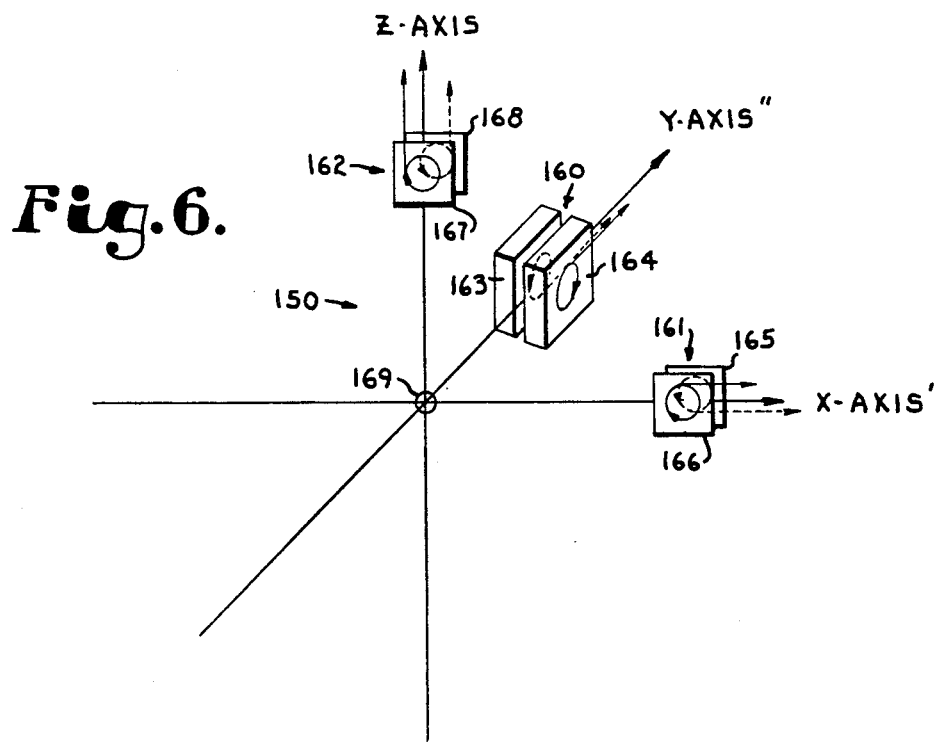
FIG. 6 is a schematic view on reduced scale showing utilization of multiple apparati according to the present invention for use in providing thrust on a three-dimensional scale.

In FIG. 6 is shown a rough schematic diagram illustrating utilization of the invention to provide linear thrust in a three-dimensional manner. The device shown in FIG. 6 is generally referred to with reference numeral 150 and includes linear thrust couples 160, 161 and 162 associated with a Y axis", an X axis' and a Z axis respectively. The couple 160 includes an apparatus according to the present invention 163 and a mirror image apparatus 164 which have associated flywheels which are shown rotating in opposite directions and providing linear thrust factors along the Y axis". The couple 161 includes apparatus 165 and mirror image 166 having flywheels which rotate in opposite directions and produce linear thrust factors along the X axis' and couple 162 comprises a device 167 and a mirror image device 168 which have flywheels which rotate in opposite directions so as to provide linear thrust factors along the Z axis. The couples 160, 161 and 162 are connected to and in front of a mass 169 having a center of gravity at the center of the three various perpendicular axes such that the couples 160, 161 and 162 cooperate to motivate the mass 169 at the center of the axes. It is foreseen that by selective variation of the rates of rotation of the various flywheels of the various couples 160, 161 and 162, that motivation of the mass 169 can be directed in any three-dimensional direction including negatively along the various axes, if the various couples associated with the respective axes are rotated in reverse.

It is noted that the motor 12 may be a single unit, as shown, or multiple units aligned perpendicularly to the planes of rotation of the flywheels 25 and 52 so as to negate rotational movement from such motors acting against the device 1. Also where separate motors are used to rotate apparatus 10 and mirror image apparatus 11, the motors are preferably positioned to dr:ve gears (such as gear 71) in opposite directions but in parallel planes.

It is to be understood that while certain forms of the present invention have been illustrated and described herein, it is not to be limited to the specific forms or arrangement of parts described and shown.

What is claimed and desired to secure by letters patent is:

1. A device for converting rotational motion to linear motion comprising:
   (a) a flywheel structure having a centrally located rotational first axis and being rotatable about said first axis; said flywheel structure comprising a flywheel extending radially outward from said first axis and at least oen weighted member;
   (b) first drive means for rotating said flywheel structure about said first axis;
   (c) said weighted member having a rotational second axis and being rotatably mounted on said flywheel at said second axis and at a position radially spaced from said first axis; said weighted member having a radial non-symmetrical mass distribution relative to said second rotational axis such that a center of gravity of the weighted member is spaced from the second axis position whereat said weighted member is rotatably mounted on said flywheel;
   (d) said flywheel being rotated by said first drive means within a plane having an X axis and a Y axis; said plane being centered at said flywheel structure first axis; and
   (e) second drive means for rotating said weighted member in synchronization with the rotation of said flywheel structure such that said weighted member center of gravity is located substantially further from said flywheel structure first axis when said weighted member is aligned with said X axis on a first side of said y axis then when said weighted member center of gravity is aligned with said X axis on an opposite side of said Y axis such that the momentum associated with said weighted member and acting through the center of gravity of such weighted member operably reacts relative to a longer radius when crossing said X axis on said first side of said Y axis than when crossing said X axis on said opposite side of said Y axis to provide a net thrust along said Y axis.

2. The device according to claim 1 wherein:
   (a) the position where said member is mounted on said flywheel structure is spaced approximately twice as far from said flywheel structure first axis as from said member center of gravity.

3. The device according to claim 1 wherein:
   (a) said flywheel structure has a periphery that is circular about said first axis and said structure is divided into a plurality of sectors; and
   (b) each of said sectors includes a mechanism substantially equivalent to said member.

4. The device according to claim 1 wherein:
   (a) said member rotates in the same direction as said flywheel structure.

5. The device according to claim 1, 2, 3 or 4 in combination with a mirror image of said device wherein:
   (a) a flywheel structure of said mirror image device rotates in the same plane but in opposite direction to said flywheel structure of said device.

6. The device according to claim 5 wherein:
   (a) said device comprises a first device;
   (b) the rotational speed of the flywheel associated with the said first device is selectively adjustable and said first device provides a linear thrust generally parallel to a Y axis associated therewith; and
   (c) a second device substantially similar to said first device and having a flywheel associated therewith having a rotational speed which is selectively adjustable and having a linear thrust which is aligned parallel to an axis perpendicular to said Y axis.

7. An apparatus for converting rotating momentum to a linear thrust comprising:
   (a) a flywheel having rotational motor means associated therewith to apply an angular momentum thereto and being rotatable about a first axis of rotation associated therewith; said flywheel being rotatable in a plane having an X axis and Y axis; said axes being centered at said first axis of rotation and said plane being stationary relative to rotation of said flywheel;
   (b) at least one member having a center of gravity associated therewith and being mounted at a second axis of rotation on said flywheel at a position spaced from said flywheel first axis of rotation; said member center of gravity being spaced from said member axis of rotation in a plane parallel to the plane associated with said flywheel; and
   (c) means for rotating said member relative to said flywheel such that said member center of gravity when aligned with said X axis on a first side of said Y axis is spaced further from said flywheel center then when said member center of gravity is aligned with said X axis on the opposite side of said Y axis and such that the momentum associated with said member and acting through the center of gravity of such member acts on a longer radius when crossing said X axis on said first side of said Y axis than when crossing said X axis on said opposite side of said Y axis to provide a net thrust along said Y axis.

8. The apparatus according to claim 7 wherein:
   (a) said flywheel and said member rotate in the same direction.

9. An apparatus for imparting linear thrust to a vehicle comprising:
   (a) an enclosure structure;
   (b) a first flywheel rotatable within a plane and having an X axis and a Y axis associated with said plane and passing through an axis of rotation of said flywheel; said flywheel generally being symmetrical about said X axis and about said Y axis;
   (c) a second flywheel rotatable within said plane and having an X axis and a Y axis associated with said plane and passing through an axis of rotation of said second flywheel; said second flywheel generally being symmetrical about said X axis and about said Y axis and approximately equal in size and shape to said first flywheels; said first and second flywheels mounted to rotate in said enclosure structure;
   (d) the axis associated with said first flywheel being co-linear with the X axis associated with said second flywheel;
   (e) rotational motor means for synchronously rotating said first flywheel and said second flywheel at substantially equivalent angular speeds; said motor means being mounted on said support structure so as to have a rotation associated therewith which is in a plane generally perpendicular to the plane of rotation associated with said first and second flywheels;
   (f) a plurality of substantially equivalent weighted members mounted in equal numbers on said first and second flywheels so as to rotate about a member rotational axis spaced from teh axis of rotation of an associated flywheel; the axis of rotation of each of said members being equally spaced from circumferentially adjacent members on the flywheel associated therewith; each of said members having a center of gravity equally spaced from the axis of rotation thereof;

(g) said rotational motor means further including connecting mechanism for rotating each of said weighted members in synchronization with rotation with the flywheel associated therewith; and further each of said members rotating at a common angular velocity to each other but at a different angular velocity relative to said flywheels such that the momentum associated with each of said members and acting through the center of gravity of a respective member acts on a longer radius when crossing said X axis on one side of said Y axis than when crossing said X axis on the opposite side of said Y axis to provide a net thrust along said Y axis;

(h) each of said members rotating in the same direction as the flywheel associated therewith; each of said members further rotating in synchronization with the flywheel associated therewith such that a center of gravity associated with such a member is further spaced from a respective flywheel axis of rotation when such member is centered over the X axis on one side of the Y axis associated therewith than when such a member is centered over the X axis on an opposite side of the Y axis associated therewith; and (l) said first flywheel and said second flywheel are rotational in opposite directions whereby a thrust is provided by said apparatus parallel to the Y axes respectfully associated with said first and second flywheels.

10. The apparatus according to claim 9 wherein:

(a) the center of gravity associated with each of said members is spaced from a respective axis of rotation of such a member approximately one-half of the distance such an axis of rotation is spaced from a respective flywheel axis of rotation.

11. The apparatus according to claim 9 wherein:

(a) said apparatus is a first apparatus;

(b) said rotational motor means of said first appratus are selectively adjustable to vary the rotational speeds of said first and second flywheels; and including (c) a second apparatus essentially identical in structure to said first apparatus and having a pair of flywheels and rotational motor means associated therewith; said second apparatus pair of flywheels being aligned so as to rotate in a plane substantially perpendicular to the plane associated with said first and second flywheels; said second rotational motor means being independent of said first rotational motor means so as to be selectively adjustable to vary the speed of rotation of said pair of flywheels associated with said second apparatus as compared to said first and second flywheels of said first apparatus;

(d) whereby the vehicle may be selectively urged to move in a two-dimensional pattern.

* * * * *